United States Patent
Link et al.

(10) Patent No.: US 9,822,807 B2
(45) Date of Patent: Nov. 21, 2017

(54) PET BARRIER FASTENER

(71) Applicant: Precision Pet Products, Inc., Costa Mesa, CA (US)

(72) Inventors: David Link, Costa Mesa, CA (US); Hongkun Liang, Zhongshan (CN)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 85 days.

(21) Appl. No.: 14/926,601

(22) Filed: Oct. 29, 2015

(65) Prior Publication Data

US 2017/0122350 A1    May 4, 2017

(51) Int. Cl.
*F16B 5/00*    (2006.01)
*A01K 1/02*    (2006.01)
*B60P 3/04*    (2006.01)

(52) U.S. Cl.
CPC .......... *F16B 5/0004* (2013.01); *A01K 1/0272* (2013.01); *B60P 3/04* (2013.01)

(58) Field of Classification Search
CPC ......... F16B 5/0004; A01K 1/0272; B60P 3/04
USPC ....................................... 296/24.43; 119/412
See application file for complete search history.

(56) References Cited

U.S. PATENT DOCUMENTS

| | | |
|---|---|---|
| 2,796,648 A | 6/1957 | Peterson |
| 2,942,314 A | 6/1960 | Debner et al. |
| 3,044,800 A | 7/1962 | Wicker |
| 3,516,043 A | 6/1970 | Spohord |
| 3,526,934 A | 9/1970 | Owen, Sr. |
| 3,894,706 A | 7/1975 | Mizusawa |
| 3,896,766 A | 7/1975 | Martin |
| 4,016,833 A | 4/1977 | Ray |
| 4,140,080 A | 2/1979 | Snader |
| 4,148,113 A | 4/1979 | Dvorachek |
| 4,527,512 A | 7/1985 | Sugiura |
| 4,528,768 A | 7/1985 | Anderson |
| 4,590,885 A | 5/1986 | Sugiura |
| 4,762,085 A | 8/1988 | Ondrasik |
| 4,763,606 A | 8/1988 | Ondrasik |
| 4,769,876 A | 9/1988 | Platt |

(Continued)

FOREIGN PATENT DOCUMENTS

CN    201123292    10/2008

OTHER PUBLICATIONS www.packagingandfastening.com; "Hartco Clinch Clips", 5 pgs.

(Continued)

*Primary Examiner* — Joseph D Pape
(74) *Attorney, Agent, or Firm* — Global IP Counselors, LLP

(57) ABSTRACT

A fastener system for use to assemble a pet barrier. The fastener system includes a body and a mountable member that is configured to attach two adjacent overlapping wire panels together to erect a pet barrier. Vertical grooves and horizontal grooves are disposed along the periphery of the interior surface of the body. The detents formed within the vertical grooves assist in retaining the vertical wire rods of the distal wire panel so that the body can hang onto the back side of the distal wire panel without the user having to hold it in place which facilitates the assembly of the pet barrier with only a single user. Thus, the fastener system allows a single user to assemble the pet barrier without the assistance of another person.

5 Claims, 8 Drawing Sheets

(56) References Cited

U.S. PATENT DOCUMENTS

| | | |
|---|---|---|
| 4,852,290 A | 8/1989 | Wallace et al. |
| 4,917,047 A | 4/1990 | Wazeter, III |
| 5,058,863 A | 10/1991 | Maffet |
| 5,097,796 A | 3/1992 | Reimers |
| D326,076 S | 5/1992 | Wiese |
| 5,167,246 A | 12/1992 | Mortenson |
| 5,233,939 A | 8/1993 | Randolph |
| 5,311,725 A | 5/1994 | Martin et al. |
| 5,335,618 A | 8/1994 | Zarola |
| 5,402,596 A | 4/1995 | Gillming, Jr. |
| 5,482,005 A | 1/1996 | Thom |
| 5,544,619 A | 8/1996 | Braun |
| 5,549,073 A | 8/1996 | Askins et al. |
| 5,626,098 A | 5/1997 | Askins et al. |
| 5,653,194 A | 8/1997 | Guy |
| 5,752,470 A | 5/1998 | Koneke |
| 5,950,568 A | 9/1999 | Axelrod et al. |
| 5,967,089 A | 10/1999 | Allen |
| 6,012,940 A | 1/2000 | Wheeler |
| 6,092,488 A | 7/2000 | Allawas |
| 6,152,081 A | 11/2000 | Baker |
| 6,155,206 A | 12/2000 | Godshaw |
| 6,192,834 B1 | 2/2001 | Kolozsvari |
| 6,305,869 B1 | 10/2001 | Chen |
| 6,405,414 B1 | 6/2002 | Byrnes et al. |
| D473,838 S | 4/2003 | Wang |
| 6,582,169 B1 | 6/2003 | Rodriguez et al. |
| 6,621,590 B1 | 9/2003 | Livingston |
| 6,681,720 B1 | 1/2004 | Skurdalsvold et al. |
| 6,706,045 B2 | 3/2004 | Lin |
| 6,796,589 B2 | 9/2004 | Dolman |
| 6,799,534 B1 | 10/2004 | Wang |
| 6,883,463 B2 | 4/2005 | Link |
| 7,017,520 B2 | 3/2006 | Wang |
| 7,316,506 B2 | 1/2008 | Deonarine |
| D631,740 S | 2/2011 | Wood |
| 8,733,293 B2 | 5/2014 | Link et al. |
| 8,973,964 B2 | 3/2015 | Link et al. |
| 9,174,599 B2 * | 11/2015 | Wang ............... A01K 1/0272 |
| 2003/0057722 A1 | 3/2003 | Dolman |
| 2003/0108385 A1 | 6/2003 | Finco et al. |
| 2007/0210597 A1 | 9/2007 | Wang |
| 2012/0181808 A1 | 7/2012 | Reed et al. |

OTHER PUBLICATIONS www.raising-rabbits.com; "Rabbit Cage Plans: Build Your Own All-Wire Cages"; 5 pgs.

www.efinch.com; "Building an All Wire Fince Cage"; 4 pgs.

\* cited by examiner

PET BARRIER FASTENER

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure generally relates to a fastener that is used to attach two adjacent wire panels together, and more specifically a pet barrier having multiple wire panels for use in an automobile to create two separate compartments.

2. Description of the Related Art

It is known that conventional fasteners such as wingnut fasteners may be used to attach two adjacent wire panels together to form a pet barrier. However, there are some deficiencies associated with using wingnut fasteners to attach two wire panels together. One significant deficiency of using wingnut fasteners to attach two wire panels together is that the installation typically requires at least two people to fasten the two wire panels together. One person has to turn a wingnut on one side while a second person has to hold a screw on the other side steady. Without help, one person may not be able to assemble the pet barrier, or the installation assembly of the pet barrier may be burdensome and take a lot of time to erect.

Another deficiency commonly associated with using wingnut fasteners is that if a single person attempts to erect the pet barrier, the user would have to reach through the holes within the wire panels to hold the screw steady while turning the wingnut. Doing this may be cumbersome and may result in the user being frustrated during the assembly process.

In view of the foregoing, there is a need in the art for an ease-of-use fastener so that the user can easily attach a plurality of wire panels together to erect a pet barrier without the assistance of another person. Various aspects of the present disclosure addresses this particular need, as will be discussed in more detail below.

BRIEF SUMMARY

A fastener system is disclosed that is specifically adapted for erecting a plurality of wire panels together by a single person in an interior cabin of an automobile in order to separate or form two different compartments. The fastener system includes a body and a mountable member. The body may include vertical and horizontal grooves around the periphery of the body, and detents within the vertical grooves. The combination of the grooves and the detents enables the installation of the plurality of wire panels by a single person since the body of the fastener system may be retained on a distal wire panel with the detents. A proximal wire panel is partially overlapped on a distal wire panel and the mountable member is threadably engaged to the body which was previously attached to and now is retained behind the distal wire panel. As such, there is a need for a second person to hold the body steady or for the installer to reach through the holes of the wire panels to hold the body steady. When the mountable member is tightened onto the body, the horizontal and vertical wire rods of the proximal and distal wire panels are disposed within grooves of the body so that the wire panels does not shift or move after installation. Therefore, if a user incorporates the fastener system to assemble a pet barrier, the user can easily attach the wire panels together without the assistance of another person.

More particularly, a fastener for attaching a first wire panel to a second wire panel together is disclosed. The fastener may comprise at least a body and a mountable member. The body may be sufficiently large enough to cover four wire rods. The body may further have a first, second, third and fourth groove that is located along the periphery of the body. The first groove and the second groove may be parallel to each other and may also have detents configured to retain the wire rods of the first wire panel in the first and second grooves for holding the body to the first wire panel. The third and fourth grooves may be parallel to each other and may also be perpendicular to the first and second grooves. The third and fourth grooves may be configured to receive corresponding transverse wire rods of the first wire panel and the second wire panel. Furthermore, the body may have a threaded hole.

The mountable member may be sufficiently large enough to cover four wire rods. The mountable member may have a threaded protrusion that is configured to be threaded onto the threaded hole of the body to clamp the first and second wire panels between the mountable member and the body. The mountable member may have a handle portion on an exterior side to rotate the mountable member in a clockwise or counter clockwise direction for respectively attaching or removing the mountable member from the body.

The body may have a plurality of indentations about the threaded hole. The mountable member may have at least two stops that slide over and are disposed in a valley of the indentations when the mountable member is attached to the body. The at least two stops may mitigate inadvertent loosening of the mountable member from the body.

The mountable member and the body may be sufficiently large enough to cover a first set of two wire rods gapped away from each other and parallel to each other, and a second set of two wire rods gapped away from each other and parallel to each other, the first and second sets of wire rods may be oriented perpendicular to each other.

In another aspect, a vehicle pet barrier for compartmentalizing an interior of an automobile is disclosed. The vehicle pet barrier may comprise a first wire panel, a second wire panel, and a wire panel fastener. The first wire panel may have first and second vertical wire rods, and also first and second horizontal wire rods. The second wire panel may have first and second vertical wire rods, and also first and second horizontal wire rods.

The wire panel fastener may comprise a body and a mountable member. The body may be sufficiently large enough to cover the first, second, third and fourth wire rods of the first wire panel. The body may have first, second, third and fourth grooves about a periphery of the body. The first groove and the second groove may be parallel to each other. The first groove and the second groove may have detents configured to retain the first vertical wire rod of the first wire panel in the first groove, and the second vertical wire rod of the first wire panel in the second groove. The first groove and the second groove may hold the body on the first wire panel. The third and fourth grooves may be parallel to each other and may also be perpendicular to the first and second grooves. The third and fourth grooves may be configured to receive the first and second horizontal transverse wire rods of the first wire panel and the second wire panel. The body may have a threaded hole.

The mountable member may be sufficiently large enough to cover the first, second, third and fourth wire rods of the second wire panel. The mountable member may have a threaded protrusion configured to be threaded onto the threaded hole of the body to clamp the first and second wire panels between the mountable member and the body, The mountable member may have a handle portion on an exterior side for rotating the mountable member in a clockwise or counter clockwise direction for attaching and removing the mountable member from the body.

In a different aspect, a method of using a fastening device to fasten a first wire panel to a second wire panel is disclosed. The method may comprise the steps of latching a body to the first wire panel; disposing the second wire panel on the first wire panel; and coupling a threaded protrusion of a mountable member to the threaded hole of the body to clamp the first wire panel and the second wire panel between the body and the mountable member.

The body may have a first vertical groove, a second vertical groove, a third horizontal groove, a fourth horizontal groove, and a though-hole centered in the middle of the body with internal threads. The first wire panel may have first and second vertical wire rods, and third and fourth horizontal wire rods. The latching step may comprise the step of inserting the first and second vertical wire rods in first and second vertical grooves of the body.

BRIEF DESCRIPTION OF THE DRAWINGS

These and other features and advantages of the various embodiments disclosed herein will be better understood with respect to the following description and drawings, in which.

DETAILED DESCRIPTION

Figure 1:
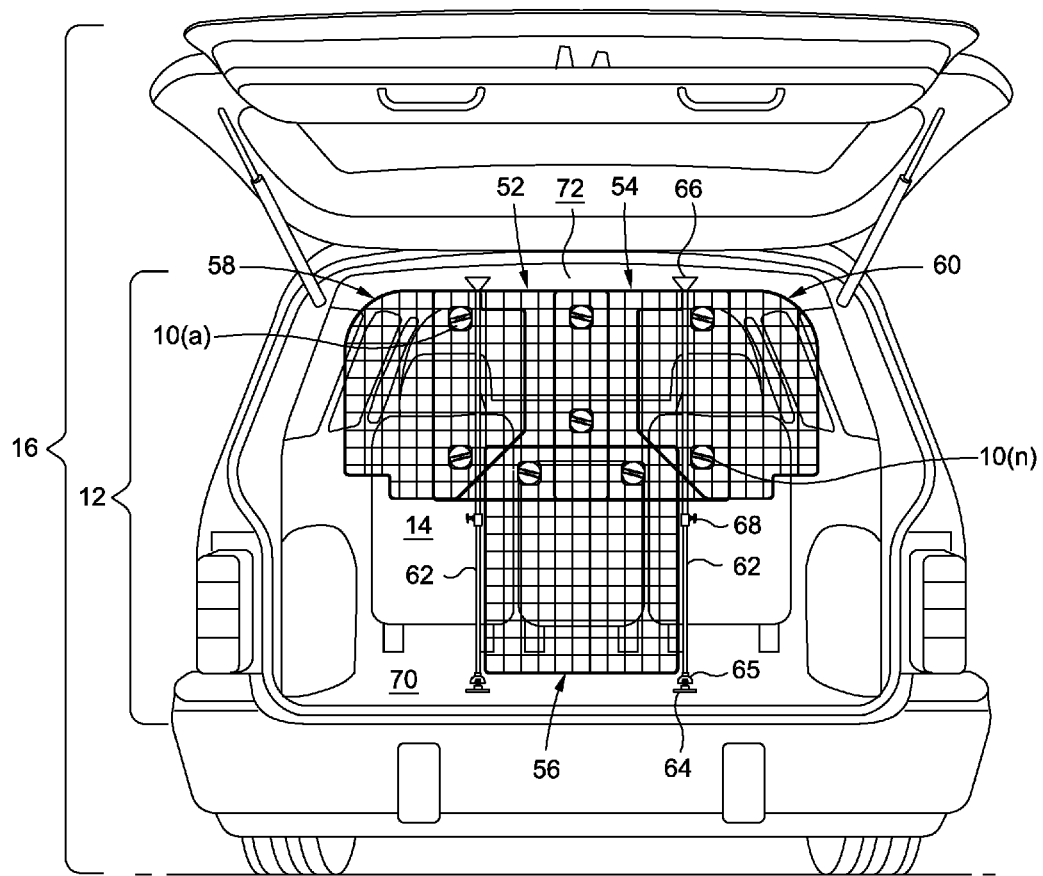
FIG. 1 is a rear view of an assembled pet barrier installed in a cabin space of an automobile using a fastener system.

Referring now to the drawings, wherein the showings are for purposes of illustrating a fastener system 10. The fastener system 10 may be used to attach two adjacent overlapping wire panels together to assemble a pet barrier 12 for use in a cabin space 14 of an automobile 16. A benefit of using the fastener system 10 to assemble the pet barrier 12 is that a user does not have to reach through the holes of the wire panels to tighten a fastener and attach two wire panels together. In addition, the use of the fastener system 10 enables a single user to assemble the pet barrier 12 without the assistance of another person. These benefits are attributed to the configuration of the fastener system 10. In particular, the interior surface of a body 18 of the fastener system 10 may have a plurality of grooves 22, 24, 26, 28 and detents 46a-n that assists in allowing the body 18 to hang onto the horizontal and vertical wire rods 38, 36 on the back side of a distal wire panel 34. To do so, distal vertical wire rods 36 may be disposed in the vertical grooves 22, 24 of the body 18 having detents 46a-n. The user may place a proximal wire panel 40 on the distal wire panel 34. In doing so, one or more of the wire rods of the proximal wire panel 40 may also be disposed within the grooves of the body 18. A mountable member 20 may be attached to the body 18 to fasten the distal and proximal wire panels 34, 40 together. In this respect, the fastener system 10 allows a single person to erect the pet barrier 12.

Referring now specifically to FIG. 1, depicted is the assembled pet barrier 12 installed in the cabin space 14 of the automobile 16. The pet barrier 12 partitions the cabin space 14 into two separate compartments, specifically, the driver and passenger compartment, and the pet compartment. This prevents a pet from entering the driver and passenger compartment so that the pet does not interfere with the driver of the automobile. The pet barrier 12 may be erected by layering one wire panel on top of each other with an overlap. The plurality of wire panels also extends from left to right and top to bottom to form the pet barrier 12. Where the wire panels overlap, one or more fasteners 10a-n may be used to attach the two overlapping panels together 34, 40.

The pet barrier 12 may be comprised of two or more wire panels. In the drawings, the pet barrier 12 includes five wire panels, namely, a medial left wire panel 52, medial right wire panel 54, center wire panel 56, left wire panel 58, and right wire panel 60. The pet barrier 12 is assembled using the fastener systems 10a-n to fasten the wire panels together. The medial left wire panel 52 and medial right wire panel 54 may each include a telescoping device 62. The telescoping device 62 may allow a user to position and stabilize the left wire panel 52 and medial right wire panel 54 within the cabin space 14 of the automobile 16. The telescoping device 62 includes a lower foot 64, pivot joint 65, upper foot 66, and height adjuster 68. When installed, the lower foot 64 contacts the floor region 70 of the automobile 16 and the height adjuster 68 may be adjusted so that the upper foot 66 contacts the ceiling 72 of the automobile 16. The pivot joint 65 may be used to ensure that the lower foot 64 and upper foot 66 are flat against the floor region 70 and the ceiling 72. The height adjuster 68 is loosened then the telescoping device 62 is extended so that the lower and upper foot 64, 66 contact and apply slight pressure against the floor region 70 and the ceiling 72. The lower foot 64 may be unthreaded to further apply a force against the floor region 70 and the ceiling 72 in order to lock the medial left and right wire panels 52, 54 in place. Since the telescoping device 62 is generally secured to the floor region 70 and ceiling 72 of the automobile 16, the telescoping device 62 acts as a foundation and may prevent the assembled pet barrier 12 from moving freely within the cabin space 12 of the automobile 16. In addition, the telescoping device 62 is sufficiently secured to the floor region 70 and the ceiling 72 to prevent a pet from knocking over the pet barrier 12 and entering the driver and passenger compartment of the cabin space 14.

Figure 2:
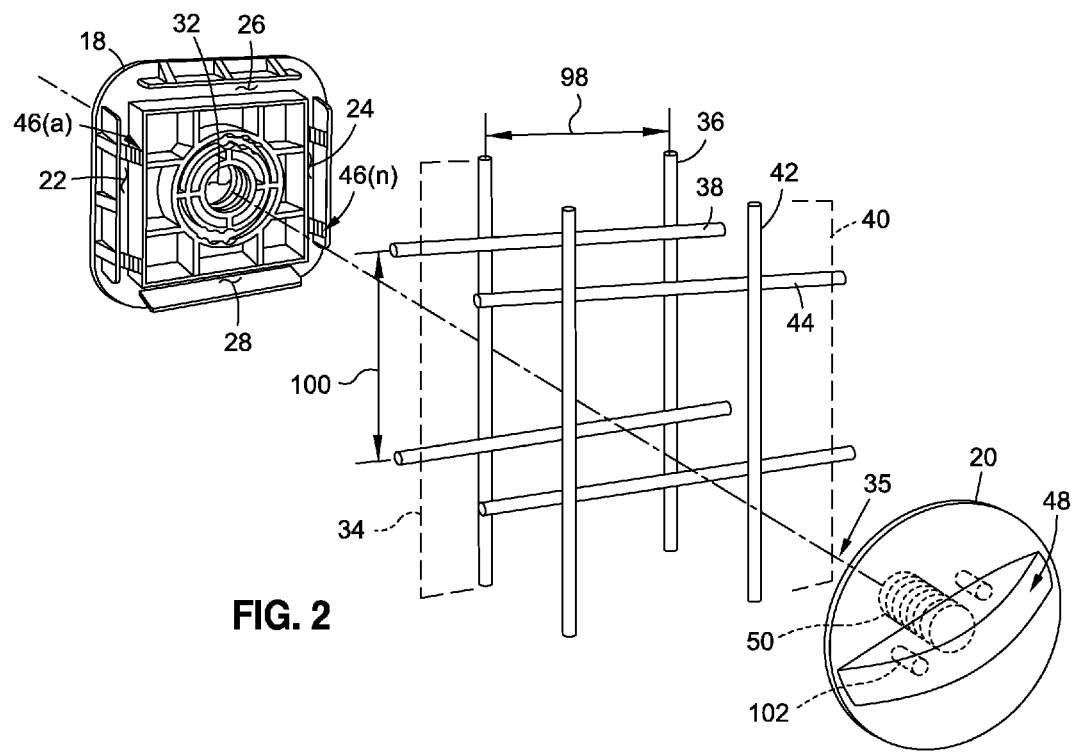
FIG. 2 is an exploded view of the fastener system and segments of a distal and a proximal wire panel.

Referring now to FIG. 2, depicted is an exploded view of the fastener system 10, and segments of the distal wire panel 34 and the proximal wire panel 40. The fastener system 10 may be made up of two portions, namely, the body 18 and the mountable member 20. The body 18 of the fastener system 10 may have grooves 22, 24, 26, 28. The detents 46a-n may be formed in the vertical grooves 22, 24 to receive vertical wire rods 36 of the distal wire panel 34. Although the drawings show only the vertical grooves 22, 24 having the detents 46a-n, it is also contemplated that the horizontal grooves 26, 28 may also be formed with detents to hold and retain the horizontal wire rods 38, 44 of the distal and proximal wire panels 34, 40. An axis 35 may be defined along a center of the body 18, segments of the distal and proximal wire panels 34, 40 and mountable member 20. The body 18 may be fabricated to have any shape so long as the area is sufficiently large to cover the corresponding horizontal wire rods 38, 44 and vertical wire rods 36, 42 of the distal wire panel 34 and proximal wire panel 40. The exterior surface of the body 18 may be flat and rounded for safety measures. The mountable member 20 may have a threaded protrusion 50 on the interior surface of the mountable member 20 and may be configured to be attachable to a threaded hole 32 of the body 18. A user may use a handle portion 48 that is located on an exterior side of the mountable member 20 to rotate the mountable member 20 in a clockwise direction to attach the mountable member 20 to the body 18. When the mountable member 20 is attached to the body 18, compressive loads are applied on the distal and proximal wire panels 34, 40 which prevent vertical and horizontal movements of the wire panels 34, 40.

FIG. 2 also depicts segments of the distal wire panel 34 and the proximal wire panel 40. The distal wire panel 34 comprises a plurality of parallel distal vertical wire rods 36 and parallel distal horizontal wire rods 38 that are disposed in separate planes. The distal horizontal wire rods 38 are stacked on and attached to the distal vertical wire rods 36 which form an array of square configurations. The distal horizontal wire rods 38 and the distal vertical wire rods 36 are gapped from each other having a width 98 and height 100. Similarly, the proximal wire panel 40 comprises a planarity of proximal parallel vertical wire rods 42 and parallel proximal horizontal wire rods 44 that are disposed in separate planes. The proximal vertical wire rods 42 are stacked on top of the proximal horizontal wire rods 44 which also form an array of square configurations. The proximal horizontal wire rods 44 and the proximal vertical wire rods 42 are gapped from each other having a width 98 and height 100 (see FIG. 3).

Figure 3:
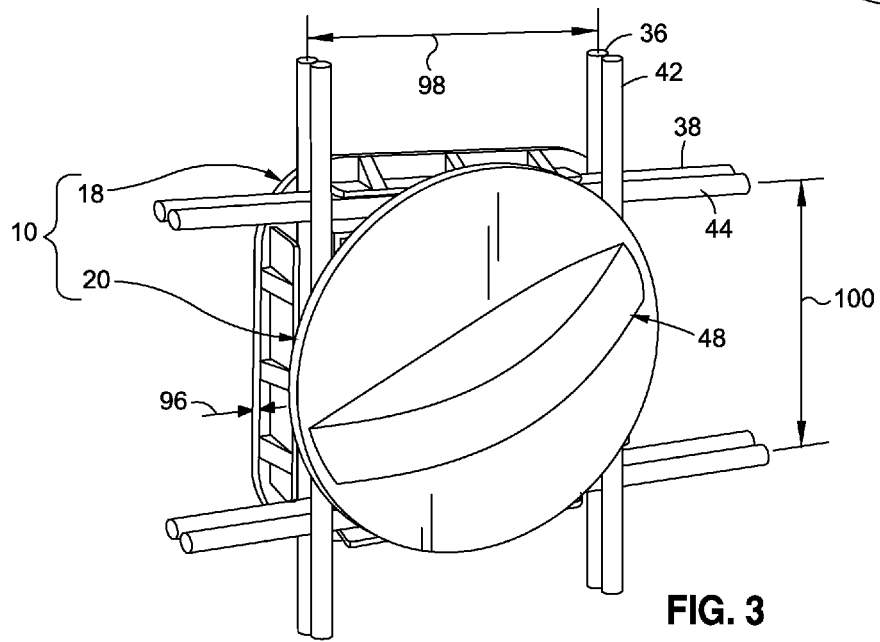
FIG. 3 is an elevational view of the fastener system in its engaged position with the segments of the distal wire panel and the proximal wire panel fastened together.

Referring now to FIG. 3, depicted is an elevational view of the fastener system 10 in its engaged position with the segments of the distal wire panel 34 and the proximal wire panel 40 fastened together. The distal vertical wire rods 36 of the distal wire panel 34 are retained in the first vertical groove 22 (see FIGS. 4 and 5) and second vertical groove 24 (see FIGS. 4 and 5) of the body 18; while distal horizontal wire rods 38 and proximal horizontal wire rods 44 are retained in the third horizontal groove 26 (see FIGS. 4 and 6) and fourth horizontal groove 28 (see FIGS. 4 and 6) of the body 18. As shown in FIG. 5, the proximal vertical wire rods 42 of the proximal wire panel 40 are not retained within the first vertical groove 22 and second vertical groove 24 of the body 18, they merely sit outside of the vertical grooves while mountable member 20 compresses the proximal vertical wire rods 42 to help secure wire panels 34, 40 in place and prevent horizontal movement. Vertical movement between relative wire panels 34, 40 is prevented since the distal horizontal wire rods 38 and proximal horizontal wire rods 44 are retained in the third horizontal groove 26 (see FIG. 6) and fourth horizontal groove 28 (see FIG. 6) of the body 18. However, it is also contemplated that the walls 78, 80 (see FIGS. 4 and 6) and/or adjacent portions of the center wall 82 may be extended so that the horizontal grooves 26, 28 of the body 18 is sufficiently deep to capture or receive both the proximal and distal horizontal wire rods 44, 38 of the proximal and distal wire panels 34, 40.

Figure 4:
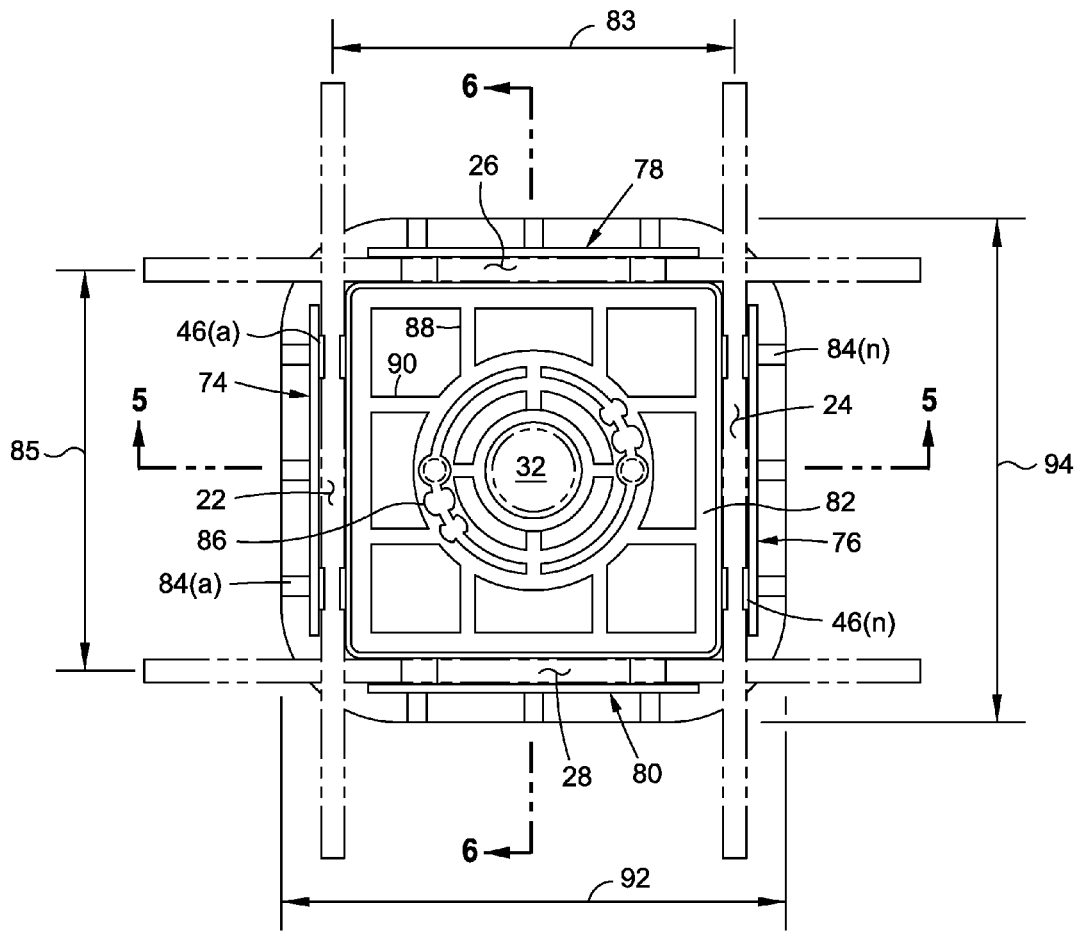
FIG. 4 illustrates an interior view of a body of the fastener system.
Figure 5:
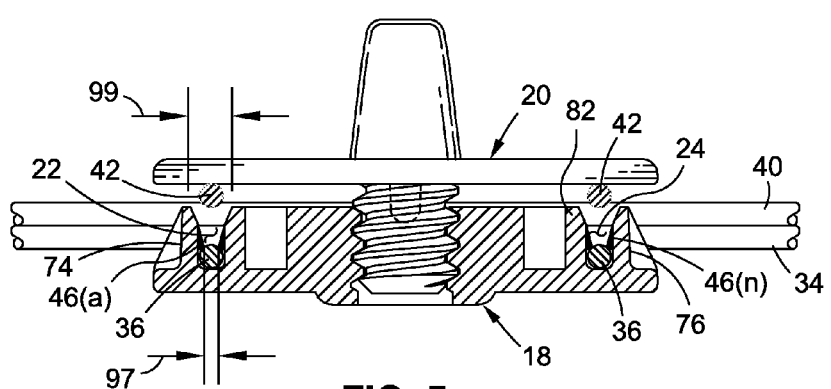
FIG. 5 illustrates a cross-sectional view taken along line 5-5 of FIG. 4 illustrating the distal wire panel and proximal wire panel located between the body and a mountable member (shown for reference) of the fastener system.

Referring now to FIG. 4, depicted is an interior view of the body 18. The body 18 may include the first vertical groove 22, second vertical groove 24, third horizontal groove 26, and the fourth horizontal groove 28 along the periphery of an interior surface 30 of the body 18. The grooves 22, 24, 26, 28 may be respectively formed by a first vertical wall 74, second vertical wall 76, third horizontal wall 78, and fourth horizontal wall 80 that surrounds a center wall 82. The center wall 82 may have four sides that are parallel to the walls 74-80. The threaded hole 32 may be positioned at a center of the body 18 and may be configured to receive the threaded protrusion 50 of the mountable member 20 to attach the body 18 and the mountable member 20 together.

Figure 6:
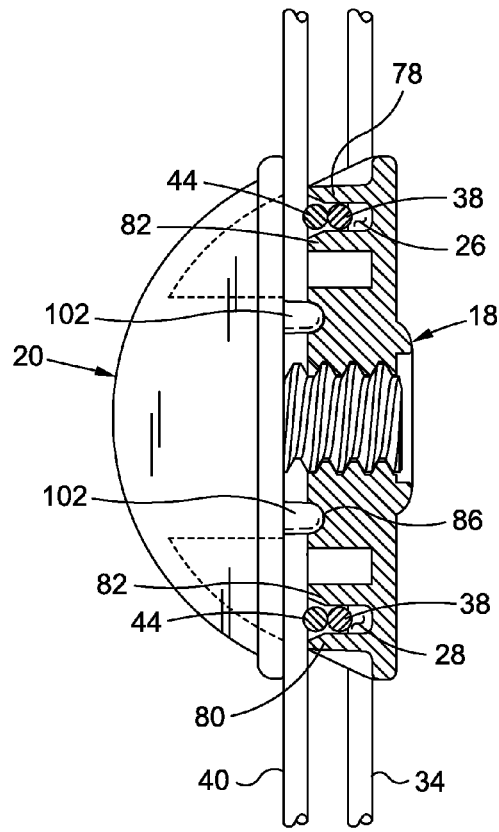
FIG. 6 illustrates a cross-sectional view taken along line 6-6 of FIG. 4 illustrating the distal wire panel and proximal wire panel located between the body and mountable member (shown for reference) of the fastener system.

The first vertical groove 22 and second vertical groove 24 may be any shape or configuration that can receive distal vertical wire rods 36 of the distal wire panel 34. In order for the vertical grooves 22, 24 to be able to receive the distal vertical wire rods 36, the lateral spacing 83 (center to center) between the first vertical groove 22 and second vertical groove 24 should be approximately the same as the spacing (center to center) between distal vertical wire rods 36 of the distal wire panel 34. By way of example and not limitation, the lateral spacing 83 may be approximately 1.625 inches. The vertical grooves may be formed by two surfaces that are general parallel to each other. The first vertical groove 22 is formed by the first vertical wall 74 and a side of the center wall 82 immediately adjacent thereto, while the second vertical groove 24 is formed by second vertical wall 76 and a portion of the center wall 82 immediately adjacent thereto. The vertical grooves also assist in preventing the distal wire panel 34 from moving laterally by receiving the proximal and distal vertical wire rods 26, 44, 28, 44 of the wire panels as shown in FIG. 6.

The horizontal grooves, namely, the third horizontal groove 26 and the fourth horizontal groove 28, may be any shape or configuration that can accommodate the distal horizontal wire rods 38 of the distal wire panel 34. In order for the horizontal grooves 26, 28 to accommodate the corresponding horizontal wire rods 38, the spacing 85 (center to center) between the third horizontal groove 26 and the fourth horizontal groove 28 should be approximately the same as the spacing (center to center) between the horizontal wire rods 38. The third and fourth horizontal grooves 26, 28 are formed by two surfaces that are general parallel to each other. In particular, the third horizontal groove 26 is formed by the third horizontal wall 78 and a portion of the center wall 82 immediately adjacent thereto, while the fourth horizontal groove 28 is formed by fourth horizontal wall 80 and a portion of the center wall 82 immediately adjacent thereto.

The body 18 may also include detents 46*a-n* disposed along the medial surfaces of the first vertical wall 74 and the second vertical wall 76, and also along the medial surfaces of the center wall 82. The detents 46*a-n* within the vertical grooves 22, 24 assists in holding the body 18 to the back side of the distal wire panel 34 so that the body 18 can hang on the wire panel 34 without the user having to hold it in place. This allows the user to use his or her hands to manipulate other objects such as another wire panel and the mountable member 20 to fasten two wire panels together with the fastener system 10. If the defects 46*a-n* are not present, the user would have to reach through the square holes formed by the horizontal and vertical wire rods and hold the body 18 in place while screwing in the mountable member 20 into the body 18 to attach the two overlapping panels together 34, 40. This may require two people to install the pet barrier 12. The fastener system 10 with the detents 46*a-n* allows a user to attach the body 18 onto the back side of the distal wire panel 34 due to the detents 46*a-n*. The detents 46*a-n* retain the distal vertical wire rods 36 of the distal wire panel 34 within the first vertical groove 22 and second vertical groove 24. This prevents the distal vertical wire rods 36 from being disengaged unless the user actively pulls the body 18 off of the wire panel to remove the distal vertical wire rods 36 from the groove.

In addition to the detents 46*a-n* in the vertical grooves 22, 24 of the body 18, the detents 46*a-n* may also be disposed along the medial surfaces of the third horizontal wall 78 and fourth horizontal wall 80. The detents 46*a-n* may be evenly distributed, or staggered along the walls 74, 76, 78, 80 and the sides of the center wall 82. If the user mounts the body 18 onto to the back side of the distal wire panel 34, the detents 46*a-n* within the third horizontal groove 26 and fourth horizontal groove 28 may also assist in holding the body 18 to the back side of the distal wire panel 34 so that the body 18 can hang on the wire panel 34 without the user having to hold it in place. This feature makes it easier for the user to screw the mountable member 20 onto the body 18 without requiring another person to hold the body 18 in position.

The body 18 may also include wall support 84*a-n* disposed along the outer surfaces of the first vertical wall 74, second vertical wall 76, third horizontal wall 78, and fourth horizontal wall 80 to assist with stiffening the walls and to prevent the walls from deflecting while the wire rods are retained within the grooves of the body 18. However, the vertical walls may provide a minute deflection that allows the distal vertical wire rods 36 to slip into and past the detents 46*a-n*. Therefore, the body 18 may be made of a flexible material that is rigid enough and also able permit minute deflections. The wall support 84*a-n* may be evenly distributed, or staggered along the outer walls.

The threaded hole 32 may be located in the middle of the body 18, and may be configured to receive the threaded protrusion 50 (see FIGS. 2 and 7) of the mountable member 20. The threaded hole 32 may be a through-hole or may have sufficient depth to accommodate the threaded protrusion 50. Alternatively, the threaded hole 32 may be located on the interior surface of the mountable member 20 while the threaded shank 50 may be located on the interior surface of the body 18. In addition, coupling the body 18 and the mountable member 20 together may be done by other methods known in the art and is not only limited to screwing the threaded protrusion 50 into the threaded hole 32 as discussed above.

The body 18 may also include a plurality of castellations 86 (see FIGS. 4 and 13) that surrounds the threaded hole 32. The castellations 86 may be in contact with the pair of stops 102 when the threaded protrusion 50 is screwed into the threaded hole 32 (see FIG. 6). The castellations 86 may help prevent the inadvertent loosing of the mountable member 20 that may be caused by the automobile's vibrations during driving conditions. In addition, the castellations 86 may provide the fastener system 10 with a predefined compression. When the pair of stops 102 contacts the castellations 86, the castellations 86 prevents the mountable member 20 from being screwed further into the body 18, therefore, it prevents further compression of the distal and proximal wire panels 34, 40. In addition, a plurality of vertical support ribs 88 and horizontal support ribs 90 may extend from an outer surface of the wall of the castellations 86 to the inner surfaces of the center wall 82. The vertical support ribs 88 and horizontal support ribs 90 may form an interior space that strengthens and makes the body 18 more rigid.

The body's 18 width 92, height 94, thickness 96 (see FIGS. 3 and 4) may be any dimension or size that is sufficient to accommodate the walls, grooves, and hole within the interior surface of body 18. The surfaces of the body 18 may also be planar or curved. The grooves may be any shape, geometry, or size that is sufficient to accommodate the wire rods of the wire panels 34, 40. The body 18 may be fabricated from a plastic, composite, or metallic element such as a 6063-T5 aluminum alloy. Of course, other suitable materials known in the art may also be used without departing from the spirit and scope of the present disclosure. Suitable materials may be rigid, flexible, and generally resistant to heat, stress, and corrosion. Additionally, injection molding and machining techniques may be utilized to manufacturer the part.

Referring now to FIG. 5, depicted is a cross-sectional view taken along line 5-5 of FIG. 4 illustrating the distal wire panel 34 and proximal wire panel 40 located between the body 18 and mountable member 20 (shown for reference) of the fastener system 10. The cross-section of the first vertical groove 22 and second vertical groove 24 is shown with the distal vertical wire rods 36 received within the vertical grooves 22, 24 while the proximal vertical wire 42 rods are shown outside of the vertical grooves 22, 24. Although the proximal vertical wire rods 42 are not disposed in the vertical grooves 22, 24, the compression between the body 18 and the mountable member 20 is sufficient to prevent horizontal movement. It is also contemplated that the vertical walls 74, 76 of the vertical grooves 22, 24 and the walls of the center wall 82 may be extended and configured to accommodate the proximal vertical wire rods 42 of the proximal wire panel 40 as discussed above to further prevent horizontal movement. The distance 97 between the detents 46*a-n* located on the vertical walls 74, 76 and the and the center wall 82 may be smaller than a diameter of the vertical wire rods 36 so that the vertical wire rods 36 may be retained within the vertical grooves 22, 24. The detents 46*a-n* may have a funnel-shaped cross-section to help guide the distal vertical wire rods 36 into the vertical grooves 22, 24. However, the detents may also have any other cross-section configuration or geometry that assists in guiding the vertical wire rods 36 into the vertical grooves 22, 24. The cross-section of the detents 46*a-n* ensures that the distal vertical wire rods 36 are more easily received within the vertical grooves 22, 24. Also, the distance 99 between interior surfaces of the vertical walls 74, 76 and the center wall 82 may be equal to or greater than the diameter of the distal vertical wire rods 36. The vertical walls 74, 76 may deflect outward to allow the distal vertical wire rods 36 to slip into the vertical grooves 22, 24 and past the detents 46a-n. Therefore, the body 18 must be made fabricated from a flexible material that permits minute deflections.

Referring now to FIG. 6, depicted is a cross-sectional view taken along line 6-6 of FIG. 4 illustrating the distal wire panel 34 and the proximal wire panel 40 located between the body 18 and mountable member 20 (shown for reference) of the fastener system 10. The cross-section of the third horizontal groove 26 and fourth horizontal groove 28 may have a funnel shaped cross-section to help guide the distal and proximal horizontal wire rods 38, 44 into the grooves. The horizontal grooves 26, 28 may prevent the vertical movement of the wire panels 34, 40. As shown in FIG. 6, the horizontal grooves 26, 28 may accommodate the distal horizontal wire rods 38 and proximal horizontal wire rods 44. Because distal horizontal wire rods 38 are stacked on and attached to the distal vertical wire rods 36, the distal horizontal wire rods 38 may not contact the bottom surface of the horizontal groove 26, 28 (see FIGS. 2 and 6). In addition, the detents 46a-n may be disposed along the medial surfaces of the third horizontal wall 78 and fourth horizontal wall 80, and also along the adjacent walls of the center wall 82 to retain the distal horizontal wire rods 38 and proximal horizontal wire rods 44 in the horizontal grooves 26, 28.

Figure 7:
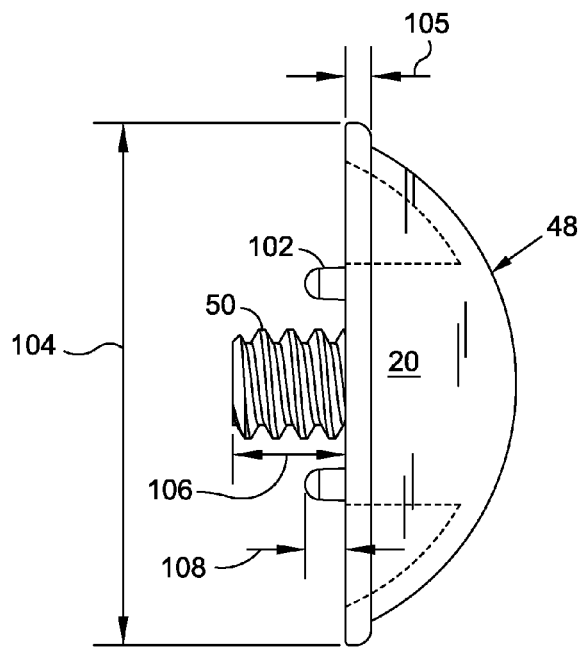
FIG. 7 illustrates a side view of the mountable member.

Referring now to FIG. 7, depicted is a side view of the mountable member 20 having a diameter 104 and thickness 105. The mountable member 20 may include the handle portion 48, threaded protrusion 50, and the pair of stops 102. The handle portion 48 may be attached to the exterior side of the mountable member 20. The handle portion 48 may be used to rotate the mountable member 20 in a clockwise or counterclockwise direction to attach or remove the mountable member 20 from the body 18. The handle portion 48 may be any shape or size and have sufficient leverage that allows the user to grip and twist the mountable member 20. The threaded protrusion 50 may extend from the flat interior surface of the mountable member 20 and may have a length 106. The threaded protrusion 50 may be configured to be threaded into the threaded hole 32 (see FIGS. 2 and 4) of the body 18. When the protrusion 50 is screwed into the threaded hole 32 of the body 18, the distal and proximal wire panels 34, 40 are clamped together and the interior surface of the mountable member 20 may contact the proximal vertical wire rods 42. The pair of stops 102 may define a 108 length. The pair of stops 102 may protrude from the interior surface of the mountable member 20 and may be located on opposed sides of the threaded protrusion 50. The pair of stops 102 may contact the castellations 86 (see FIGS. 4 and 6) located the body 18 which may prevent the inadvertent loosing of the mountable member 20 caused by vibrations while driving the automobile 16. The pair of stops 102 may evenly distribute compressive loads on the wire panels 34, 40 and may help minimize the vertical and horizontal movement of the wire panels 34, 40.

In the drawings, the body 18 has been described as having the vertical and horizontal grooves 22,24,26,28. However, the opposite configuration is contemplated. The mountable member 20 may instead contain the vertical and horizontal grooves 22,24,26,28 and be configured to receive the wire rods while the interior surface of the body 18 may be a flat surface and not contain any grooves.

The mountable member 20 may be any dimension or size, and may be fabricated from a plastic, composite, or metallic element. Other suitable materials known in the art may also be used without departing from the spirit and scope of the present disclosure. Suitable materials may be rigid, flexible, and generally resistant to heat, stress, and corrosion. Additionally, molding and extrusion techniques may be utilized to manufacturer the part.

Figure 8:
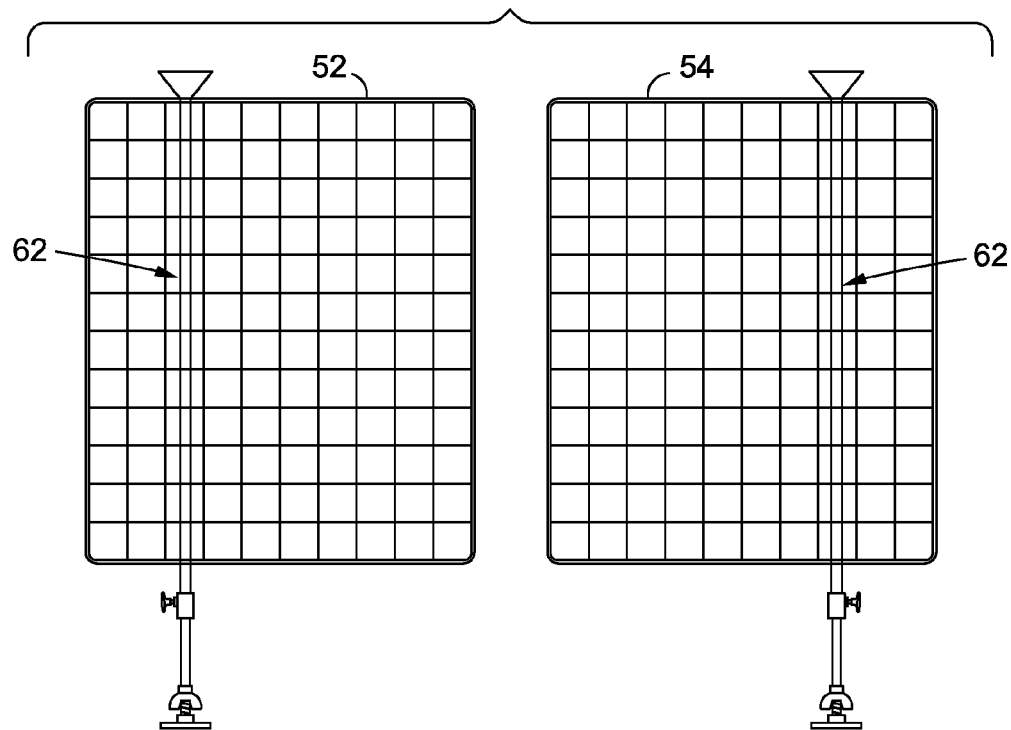
FIG. 8 illustrates a medial left wire panel and a medial right wire panel, each with an attached telescoping device.
Figure 9:
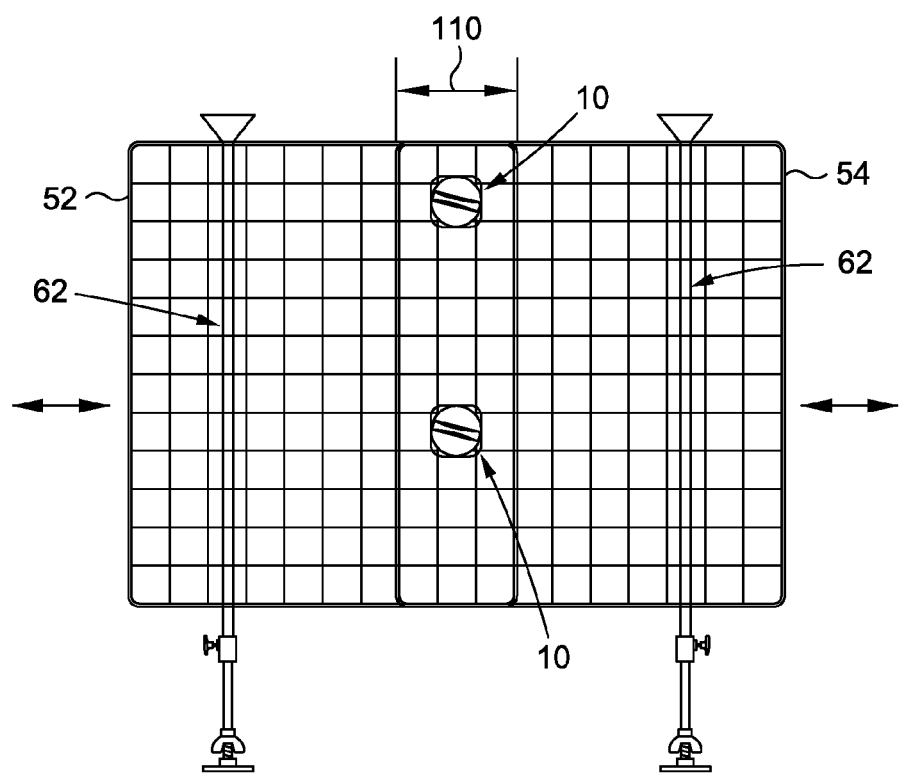
FIG. 9 illustrates the medial left wire panel and the medial right wire panel fastened by the fastener systems.

Referring now to FIG. 8, depicted are the medial left wire panel 52 and medial right wire panel 54 with an attached telescoping device 62. FIG. 9 depicts the medial left wire panel 52 and medial right wire panel 54 that is fastened by the fastener systems 10. The medial right wire panel 54 may be stacked on top of the medial left wire panel 52 with an overlap 110 along the edges of the two wire panels 52, 54.

Figure 10:
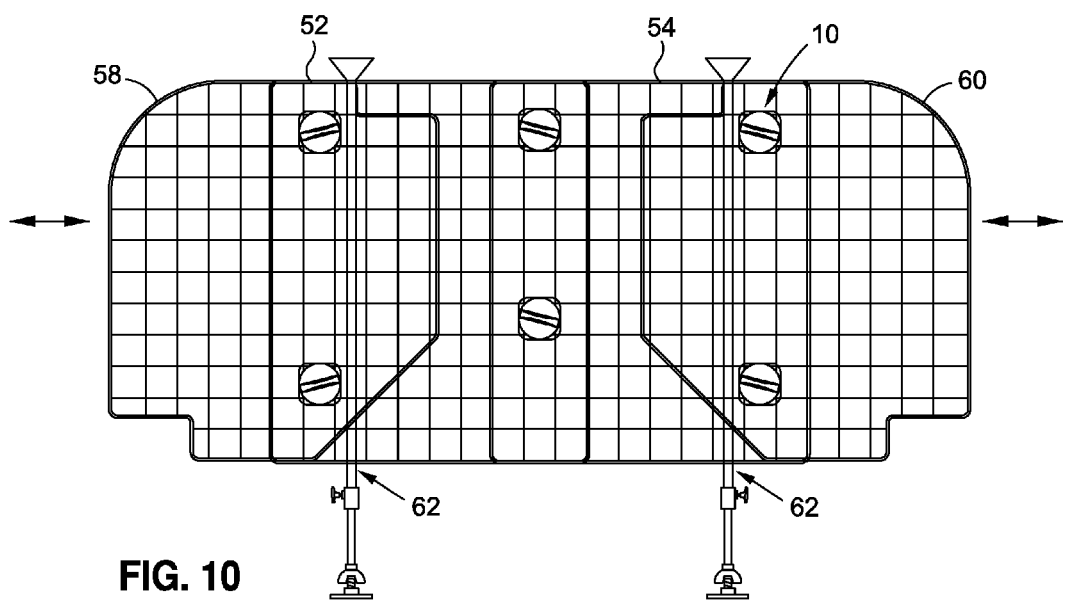
FIG. 10 illustrates the medial left wire panel, the medial right wire panel, a left wire panel, and a right wire panel fastened by the fastener system.
Figure 11:
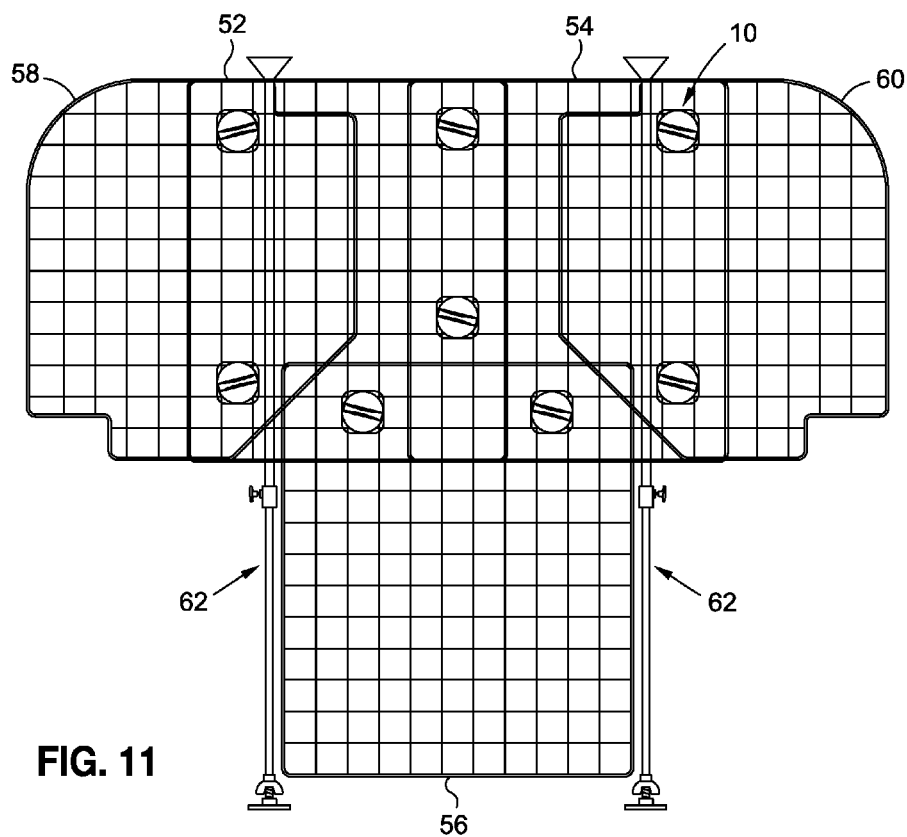
FIG. 11 illustrates a final assembled pet barrier configuration.

Referring now to FIG. 10, depicted are the medial left wire panel 52, medial right wire panel 54, left wire panel 58, and right wire panel 60 fastened by the fastener systems 10. The final assembled pet barrier 12 configuration is shown in FIG. 11. By way of example and not limitation, a total of eight fastener systems 10 may be used to erect the pet barrier 12 to form the pet barrier 12 in the automobile 16. The wire panels may be stacked on top of the other with an overlap to fasten the adjacent panels together.

Figure 12:
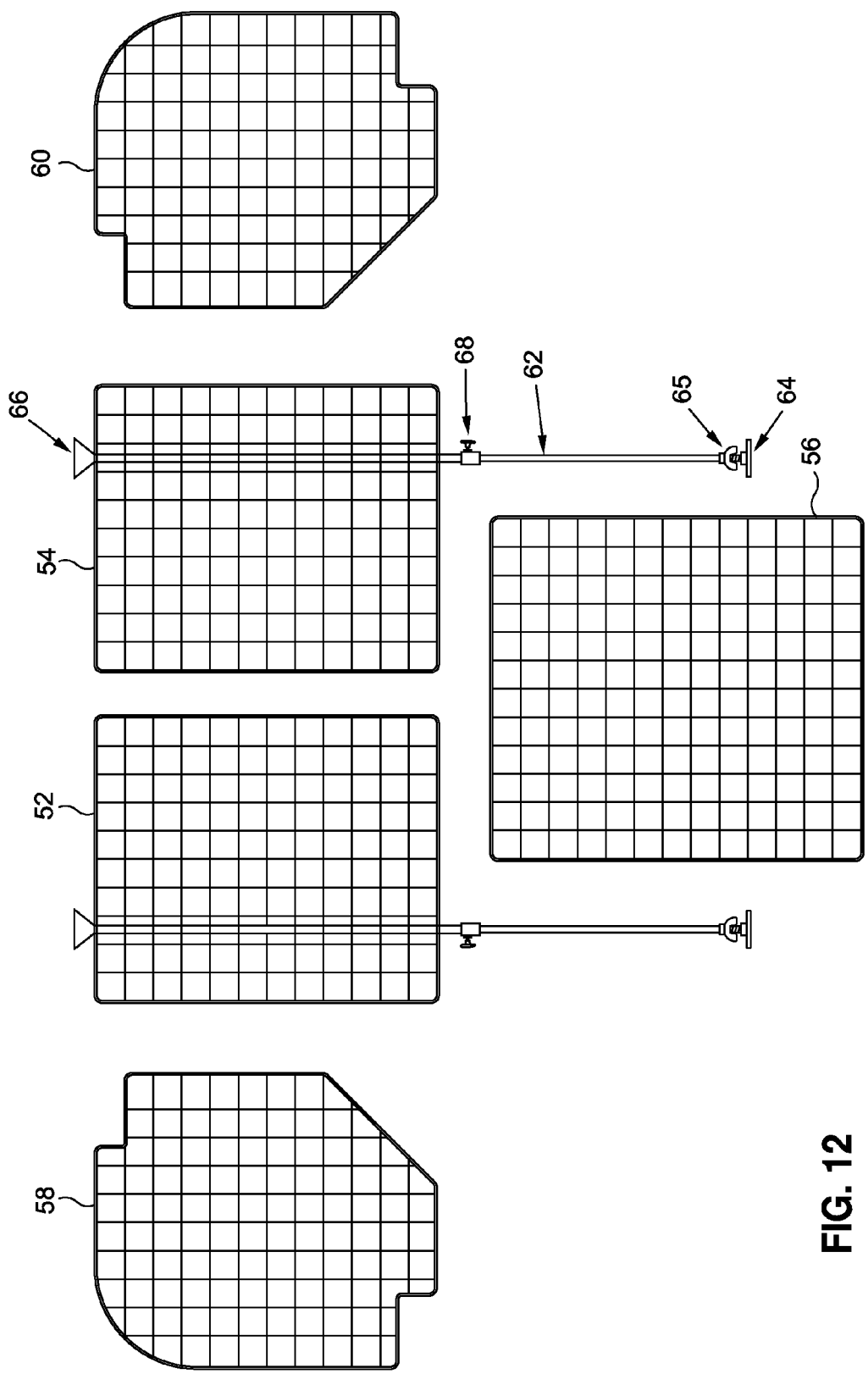
FIG. 12 illustrates an exploded view of the pet barrier comprising five wire panels.

Referring now to FIG. 12, depicted is an exploded view of the pet barrier 12 comprising five wire panels, namely, the medial left wire panel 52, medial right wire panel 54, center wire panel 56, left wire panel 58, and right wire panel 60. The medial left wire panel 52 and medial right wire panel 54 may include the telescoping device 62 that allows the user to position the pet barrier 12 and secure the wire panels to the floor 70 and ceiling 72 of the automobile 16. The telescoping device 62 may include a lower foot 64, upper foot 66, and height adjuster 68.

Figure 13:
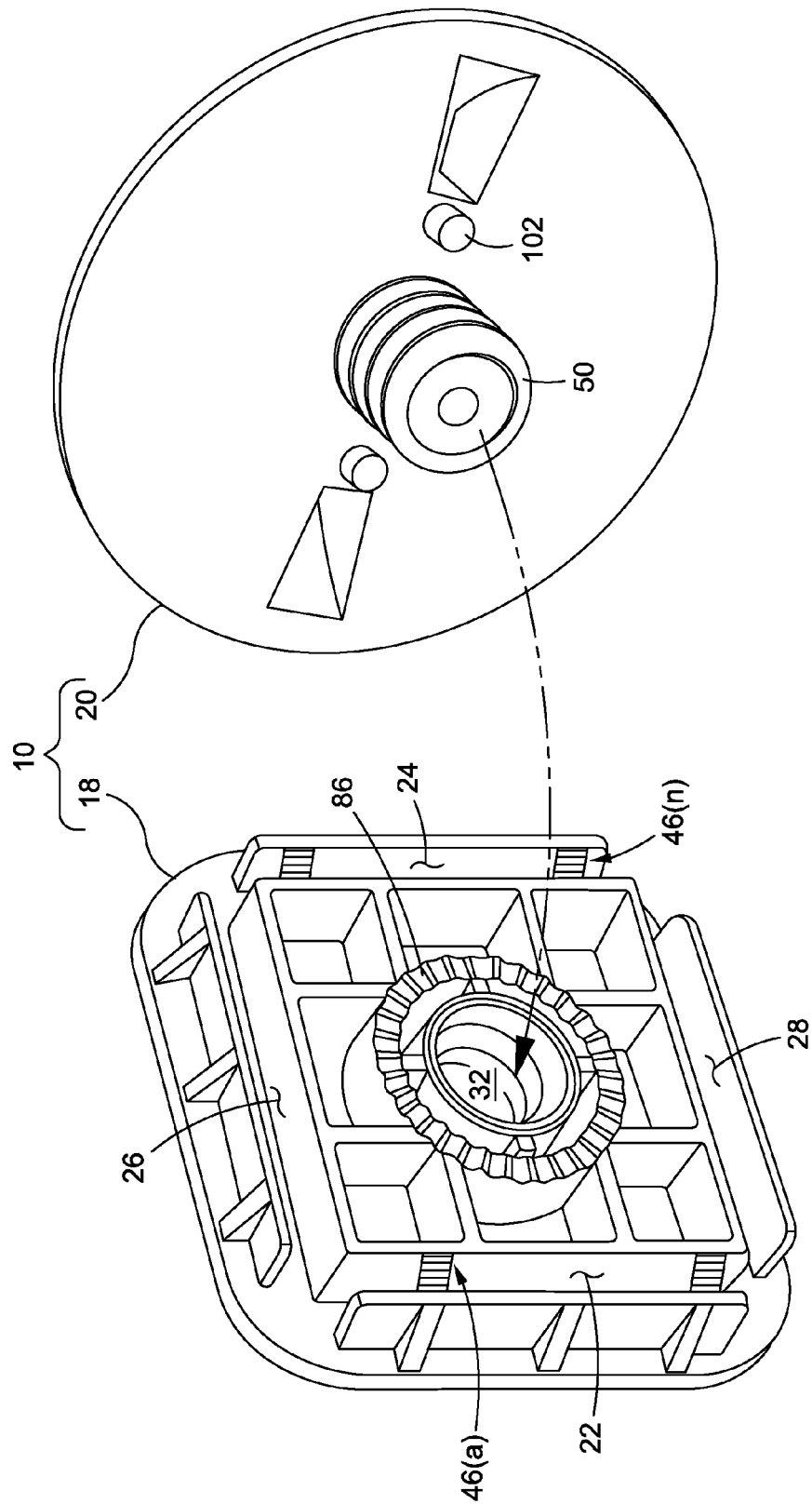
FIG. 13 illustrates an alternate configuration of the fastener system.

Referring now to FIG. 13, depicted is an alternate configuration of fastener system 10. The main difference is that the castellations 86 region of the body 18 may include a plurality of jagged ridges that surrounds the threaded hole 32, and the threaded hole 32 is a blind hole with a predefined depth. This alternate configuration may provide the fastener system 10 with various compression settings. When the user screws in the mountable member 20 into the threaded hole 32, the pair of stops 102 contacts the plurality of jagged ridges, however, the configuration of the jagged ridges may allow the mountable member 20 to be screwed in further to provide additional compression on the wire panels 34, 40. The compression on the wire panels 34, 40 may be limited by the depth of the threaded hole 32 since the bottom surface of the threaded hole 32 may contact the threaded protrusion 50 and prevent the user from further screwing in the mountable member 20 into the threaded hole 32.

With the basic structural features of fastener system 10 described above, an exemplary description of using the fastener system 10 to install the plurality of wire panels to create two separate compartments within the cabin space 14 of the automobile 16 is provided herein below. By way of example and not limitation, the user may first position the medial left wire panel 52 in the desired position within the cabin space 14 of the automobile 16. The user may orient the body 18 according to the arrows (not shown) indicated on the body 18 and proceed to mount the body 18 to the back side of the medial left wire panel 52. To do this, the user may push the body 18 into the left wire panel 52 so that the distal vertical wire rods 36 of the medial left wire panel 52 are inserted into the first vertical groove 22 and second vertical groove 24 of the body 18. Because of the detents 46a-n located within the vertical grooves 22,24, the vertical walls 74,76 may slightly bend so that the distal vertical wire rods 36 passes through the detents so that they are secured within the vertical grooves 22,24. The user may also insert the distal horizontal wire rods 38 into the third horizontal groove 26 and fourth horizontal groove 28 so that the horizontal wire rods 38 are nested in the third horizontal groove 26 and fourth horizontal groove 28. The detents 46a-n may assist in holding the body 18 against the medial left wire panel 52 in place so that the user can allow body 18 to hang onto the back side of the medial left wire panel 52 while continuing to manipulate and assemble the pet barrier 12 without the assistance of another person.

The user may then proceed to position the medial left wire panel 52 and medial right wire panel 54 within the cabin space 14 of the automobile 16. The medial left wire panel 52 and medial right wire panel 54 may be positioned so that there is an overlap between the two wire panels and that the medial left wire panel 52 is the distal wire panel and located on the left side of the automobile 16 with respect to the medial right wire panel 54. Once the user confirms the desired placement of the medial left wire panel 52 and medial right wire panel 54, the user may extend the members of the telescoping device 62 so that the lower foot 64 and upper foot 66 of the telescoping device 62 are secured to the floor region 70 and ceiling 72 of the automobile 16. The pivot joint 65 may be adjusted to alter the angle of the telescoping device 62 to ensure that the lower foot 64 and upper foot 66 are respectively coplanar with the floor region 70 and the ceiling 72. The lower foot 64 may be unthreaded to further apply a force against the floor region 70 and the ceiling 72 in order to lock the medial left and right wire panels 52, 54. Since the telescoping device 62 is secured to the floor region 70 and ceiling 72 of the automobile 16, the telescoping device 62 may act as a foundation, therefore, the medial left wire panel 52 and medial right wire panel 54 are held in place by the telescoping member.

The user may then dispose the medial right wire panel 54 onto the medial left wire panel 52. At this point, the horizontal wire rods of the medial left wire panel 52 and medial right wire panel 54 should be nested in the third horizontal groove 26 and the fourth horizontal groove 28 of the body 18. The user may then proceed to screw the threaded protrusion 50 of the mountable member 20 into to the threaded hole of the body 18 to attach the medial left wire panel 52 and the medial right wire panel 54 together (See FIG. 9). The mountable member 20 may apply a compressive force to help retain and trap the horizontal wire rods within the third horizontal groove 26 and the fourth horizontal groove 28. The mountable member 20 also assists in mitigating the movement of the wire panels. At this stage, the user may verify that the medial left wire panel 52 and the medial right wire panel 54 are secured to each other.

In a similar manner, with a stacking sequence from the front of the automobile 16 to the rear of the automobile 16, the user may proceed to fasten the remaining wire panels. The user may orient and mount the body 18 to the back side of the medial left wire panel 52 and the medial right wire panel 54 by pushing the body 18 into the back side of the panels so that the distal vertical wire rods 36 of the medial left wire panel 52 and the medial right wire panel 54 are inserted into the first vertical groove 22 and second vertical groove 24 of the body 18. If necessary, the user may bend the vertical walls of the body 18 so that the distal vertical wire rods 36 pass through the detents 46a-n. The user may proceed to insert the distal horizontal wire rods 38 of the medial left wire panel 52 and the medial right wire panel 54 into the third horizontal groove 26 and fourth horizontal groove 28 of the body 18. At this point, the body 18 should be able to hang freely onto the back side of the wire panels 52, 54 without the user having to hold it in place. With the body 8 hanging on the back side of the wire panels 52, 54, the user may dispose the center wire panel 56 onto the medial left wire panel 52 and the medial right wire panel 54 and screw the protrusion 50 of the mountable member 20 into to the threaded hole of the body 18 to attach the center wire panel 56 to the medial left wire panel 52 and the medial right wire panel 54.

Finally, the user may proceed to attach the right wire panel 60 to medial right wire panel 54, and the left wire panel 58 to medial left wire panel 52 in accordance to the steps described above. The final assembled pet barrier 12 is depicted in FIG. 11.

It is to be appreciated that specific dimensions, proportions, shapes and configurations of each of the fastener system 10 are not only limited by the present disclosure. For example, the shape of the body 18 and the mountable member 20 may be of any other suitable shape that can fasten two adjacent wire panels together.

Furthermore, although the foregoing describes the fastener system 10 as being particularly suited for wire panels to construct the pet barrier 12, in this respect, various embodiments of the fastener system 10 may be particularly adapted for use with other objects.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

The detailed description set forth below in connection with the appended drawings is intended as a description of certain embodiments of the fastener system 10 and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

What is claimed is:

1. A fastener for attaching a first wire panel to a second wire panel together, the fastener comprising:
  a body sufficiently large to cover four wire rods, the body having first, second, third and fourth grooves about a periphery of the body, the first groove and the second groove being parallel to each other and having detents configured to retain the wire rods of the first wire panel in the first and second grooves for holding the body to the first wire panel, the third and fourth grooves being parallel to each other and perpendicular to the first and second grooves and being configured to receive corresponding transverse wire rods of the first wire panel and the second wire panel, the body having a threaded hole; and a mountable member sufficiently large to cover four wire rods, the mountable member having a threaded protrusion configured to be threaded onto the threaded hole of the body to clamp the first and second wire panels between the mountable member and the body, the mountable member having a handle portion on an exterior side for rotating the mountable member in a clockwise or counter clockwise direction for removably attaching the mountable member to the body.

2. The fastener of claim 1 having a plurality of indentations about the threaded hole and the mountable member having at least two stops that slide over and are disposed in a valley of the indentations when the mountable member is attached to the body and mitigating inadvertent loosening of the mountable member from the body.

3. The fastener of claim 1 wherein the mountable member and the body are sufficiently large to cover a first set of two rods gapped away from each other and parallel to each other and a second set of two wire rods gapped away from each other and parallel to each other, the first and second sets of wire rods oriented perpendicular to each other.

4. A vehicle pet barrier for compartmentalizing an interior of an automobile, the vehicle pet barrier comprising:
   a first wire panel having first and second vertical wire rods and first and second horizontal wire rods;
   a second wire panel having a first and second vertical wire rods and first and second horizontal wire rods;
   a wire panel fastener comprising:
   a body sufficiently large to cover the first, second, third and fourth wire rods of the first wire panel, the body having first, second, third and fourth grooves about a periphery of the body, the first groove and the second groove being parallel to each other and having detents configured to retain the first vertical wire rod of the first wire panel in the first groove and the second vertical wire rod of the first wire panel in the second groove for holding the body on the first wire panel, the third and fourth grooves being parallel to each other and perpendicular to the first and second grooves and being configured to receive the first and second horizontal transverse wire rods of the first wire panel and the second wire panel, the body having a threaded hole; and
   a mountable member sufficiently large to cover the first, second, third and fourth wire rods of the second wire panel, the mountable member having a threaded protrusion configured to be threaded onto the threaded hole of the body to clamp the first and second wire panels between the mountable member and the body, the mountable member having a handle portion on an exterior side for rotating the mountable member in a clockwise or counterclockwise direction for removably attaching the mountable member to the body.

5. A method of using a fastening device to fasten a first wire panel to a second wire panel, the method comprising the steps of:
   latching a body to the first wire panel, the body having a first vertical groove, a second vertical groove, a third horizontal groove, a fourth horizontal groove, and a though-hole centered in the middle of the body with internal threads and the first wire panel has first and second vertical wire rods and third and fourth horizontal wire rods, the latching comprising inserting the first and second vertical wire rods in first and second vertical grooves of the body;
   disposing the second wire panel on the first wire panel; and
   coupling a threaded protrusion of a mountable member to the threaded hole of the body to clamp the first wire panel and the second wire panel between the body and the mountable member.

* * * * *